US012600126B2

(12) United States Patent
Takamura

(10) Patent No.: US 12,600,126 B2
(45) Date of Patent: Apr. 14, 2026

(54) DRIVING DEVICE AND LIQUID EJECTING APPARATUS

(71) Applicant: RISO Technologies Corporation, Tokyo (JP)

(72) Inventor: Jun Takamura, Mishima Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 6 days.

(21) Appl. No.: 18/537,186

(22) Filed: Dec. 12, 2023

(65) Prior Publication Data

US 2024/0326417 A1 Oct. 3, 2024

(30) Foreign Application Priority Data

Mar. 28, 2023 (JP) ................................. 2023-051537

(51) Int. Cl.
*B41J 2/045* (2006.01)

(52) U.S. Cl.
CPC ....... *B41J 2/04588* (2013.01); *B41J 2/04581* (2013.01); *B41J 2/04591* (2013.01); *B41J 2/04593* (2013.01)

(58) Field of Classification Search
CPC ................ B41J 2/04588; B41J 2/04581; B41J 2/04591; B41J 2/04593; B41J 2/04596; B41J 2202/10; B41J 2/04595
See application file for complete search history.

(56) References Cited

U.S. PATENT DOCUMENTS 9,630,402 B2 4/2017 Kimura
10,252,518 B2 4/2019 Nitta
2018/0272706 A1 9/2018 Kikuchi

FOREIGN PATENT DOCUMENTS

EP 3127704 A1 2/2017
EP 3378649 A1 9/2018
JP 4161631 B2 * 10/2008

OTHER PUBLICATIONS

European Communication pursuant to Article 94(3) EPC dated Oct. 23, 2023, mailed in counterpart European Application No. 24152898.3, 5 pages.
Extended European Search Report dated Jul. 16, 2024, mailed in counterpart European Application No. 24152898.3, 8 pages.

* cited by examiner

*Primary Examiner* — Justin Seo
(74) *Attorney, Agent, or Firm* — Kim & Stewart LLP

(57) ABSTRACT

According to one embodiment, a driving device for liquid ejection heads includes a control unit configured to apply a multi-droplet waveform to a liquid ejecting element. The multi-droplet waveform is one of a plurality of preset patterns in which each droplet waveform in the multi-droplet waveform is one of a reference ejection waveform or a minute adjustment waveform. The reference ejection waveform causes a droplet of a nominal reference volume to be ejected by the liquid ejecting element. The minute adjustment waveform causes a droplet of less than the nominal reference volume to be ejected by the liquid ejecting element in variable volume increments.

10 Claims, 7 Drawing Sheets

FIG. 6

| PRINT PATTERN | FIRST drop | SECOND drop | THIRD drop | FOURTH drop |
|---|---|---|---|---|
| 0 | NON-EJECTION | NON-EJECTION | NON-EJECTION | NON-EJECTION |
| 1 | MINUTE ADJUSTMENT DROP WAVEFORM | REFERENCE DROP WAVEFORM | REFERENCE DROP WAVEFORM | REFERENCE DROP WAVEFORM |
| 2 | MINUTE ADJUSTMENT DROP WAVEFORM | MINUTE ADJUSTMENT DROP WAVEFORM | REFERENCE DROP WAVEFORM | REFERENCE DROP WAVEFORM |
| 3 | MINUTE ADJUSTMENT DROP WAVEFORM | MINUTE ADJUSTMENT DROP WAVEFORM | MINUTE ADJUSTMENT DROP WAVEFORM | REFERENCE DROP WAVEFORM |
| 4 | MINUTE ADJUSTMENT DROP WAVEFORM | MINUTE ADJUSTMENT DROP WAVEFORM | MINUTE ADJUSTMENT DROP WAVEFORM | MINUTE ADJUSTMENT DROP WAVEFORM |

FIG. 7

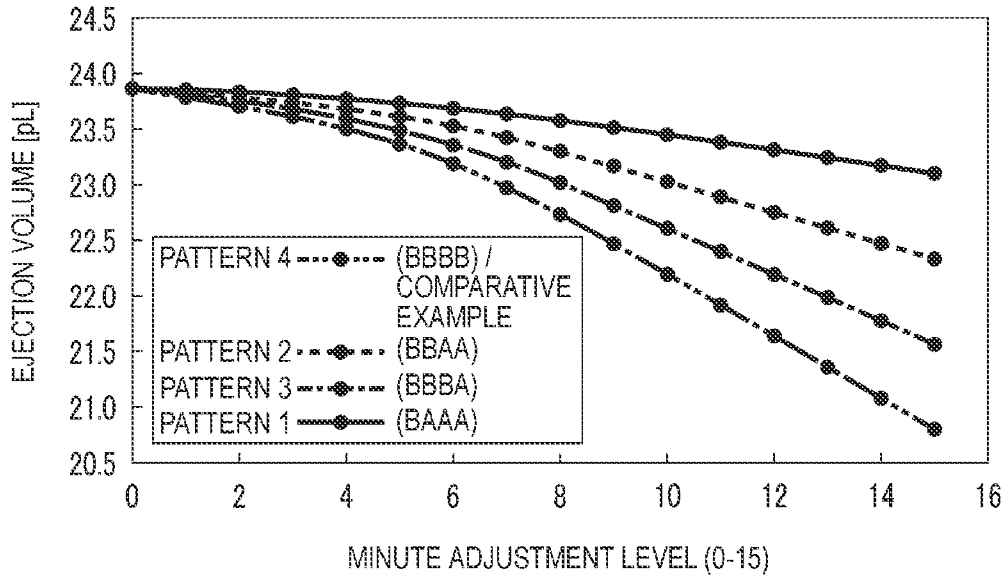

FIG. 10

| PRINT PATTERN | FIRST drop | SECOND drop | THIRD drop | FOURTH drop |
|---|---|---|---|---|
| 0 | NON-EJECTION | NON-EJECTION | NON-EJECTION | NON-EJECTION |
| 1 | MINUTE ADJUSTMENT DROP WAVEFORM | NON-EJECTION | NON-EJECTION | NON-EJECTION |
| 2 | MINUTE ADJUSTMENT DROP WAVEFORM | MINUTE ADJUSTMENT DROP WAVEFORM | NON-EJECTION | NON-EJECTION |
| 3 | MINUTE ADJUSTMENT DROP WAVEFORM | MINUTE ADJUSTMENT DROP WAVEFORM | MINUTE ADJUSTMENT DROP WAVEFORM | NON-EJECTION |
| 4 | MINUTE ADJUSTMENT DROP WAVEFORM | MINUTE ADJUSTMENT DROP WAVEFORM | MINUTE ADJUSTMENT DROP WAVEFORM | MINUTE ADJUSTMENT DROP WAVEFORM |

FIG. 11

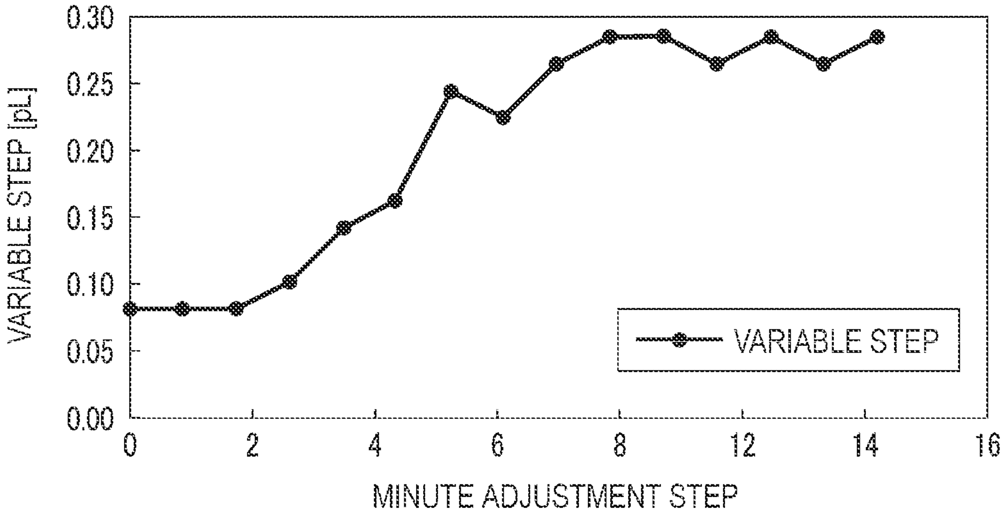

DRIVING DEVICE AND LIQUID EJECTING APPARATUS

CROSS-REFERENCE TO RELATED APPLICATION

This application is based upon and claims the benefit of priority from Japanese Patent Application No. 2023-051537, filed Mar. 28, 2023, the entire contents of which are incorporated herein by reference.

FIELD

Embodiments described herein relate generally to a liquid ejection head driving device and a liquid ejecting apparatus.

BACKGROUND

In liquid ejecting apparatuses such as inkjet heads, multidrop driving is known as one type of ejection control. In multidrop driving, the total ejection volume of an integer multiple of a fixed unit ejection volume obtained repeat of a single driving waveform (droplet ejection waveform) multiple times for ejecting ink droplets within one print period. For example, if ejection is controlled as a multidrop type, the number of drops ejected is selected in accordance with print data. It is also possible to adjust the ejection volume of individual droplets using a minute adjustment of an ejection pulse of a driving waveform given to a nozzle based on data for minute adjustments separate from the print data. In such an ejection control, the adjustment steps must be relatively coarse if the number of drops to be adjusted is numerous.

In such inkjet heads, finer adjustment is required to improve print performance.

BRIEF DESCRIPTION OF THE DRAWINGS

FIG. 6 is a diagram illustrating correspondence of a print pattern and a combination of driving waveforms according to an embodiment.

FIG. 7 is a diagram illustrating an ejection volume and a minute adjustment level for an embodiment and a comparative example.

FIG. 10 is a diagram illustrating correspondence of a print pattern and a combination of driving waveforms according to the comparative example.

FIG. 11 is a diagram illustrating a minute adjustment step and a variable step in a print pattern.

DETAILED DESCRIPTION

An object of an exemplary embodiment is to provide a driving device and a liquid ejecting apparatus having finer adjustment capabilities for improved print quality or the like.

In general, according to one embodiment, a driving device for liquid ejection heads includes a control unit configured to apply a multi-droplet waveform to a liquid ejecting element. The multi-droplet waveform is one of a plurality of preset patterns in which each droplet waveform in the multi-droplet waveform is one of a reference ejection waveform or a minute adjustment waveform. The reference ejection waveform causes a droplet of a nominal reference volume to be ejected by the liquid ejecting element. The minute adjustment waveform causes a droplet of less than the nominal reference volume to be ejected by the liquid ejecting element in variable volume increments.

Figure 1:
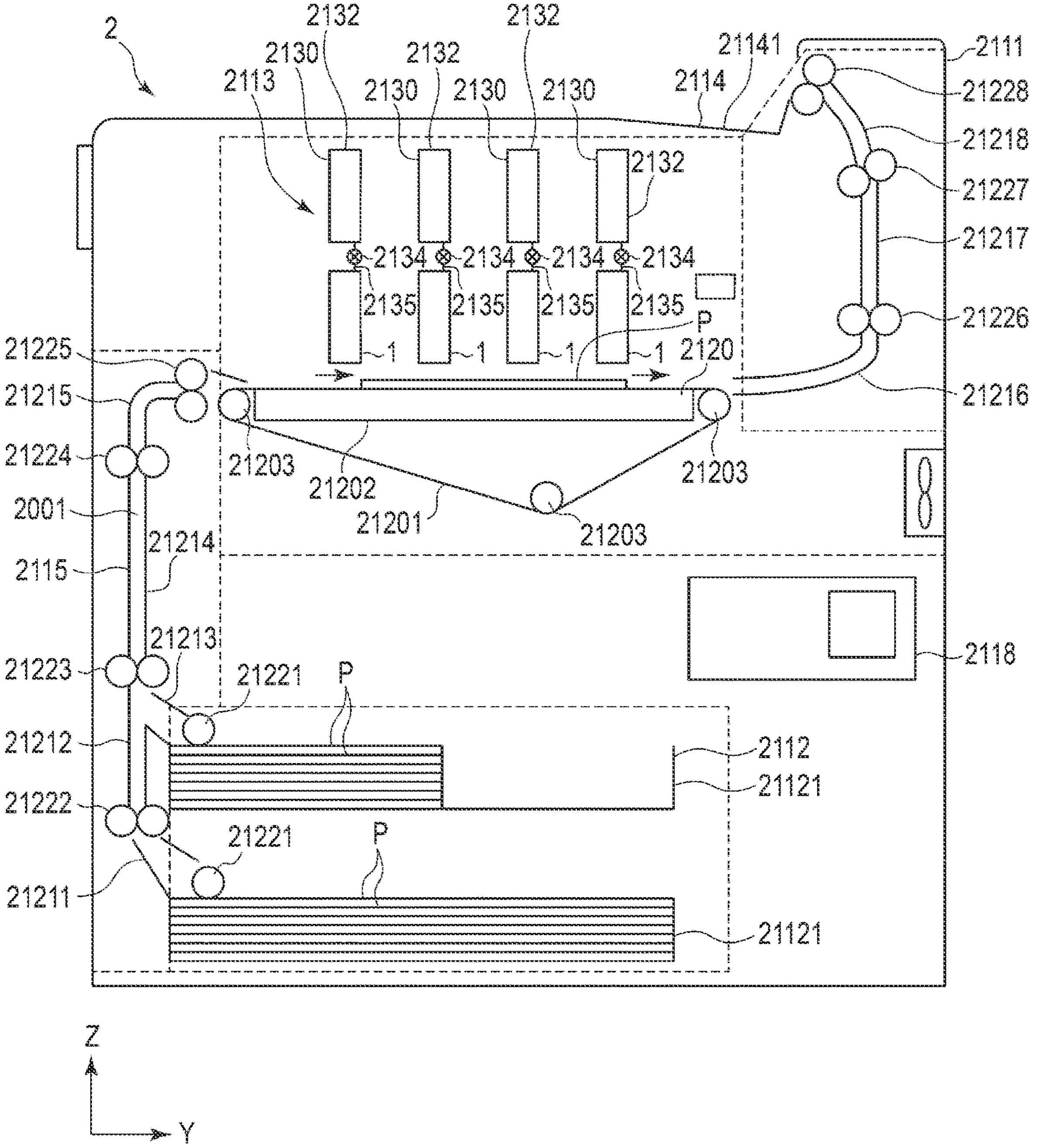
FIG. 1 is a diagram illustrating a configuration of a liquid ejecting apparatus according to a first embodiment.
Figure 2:
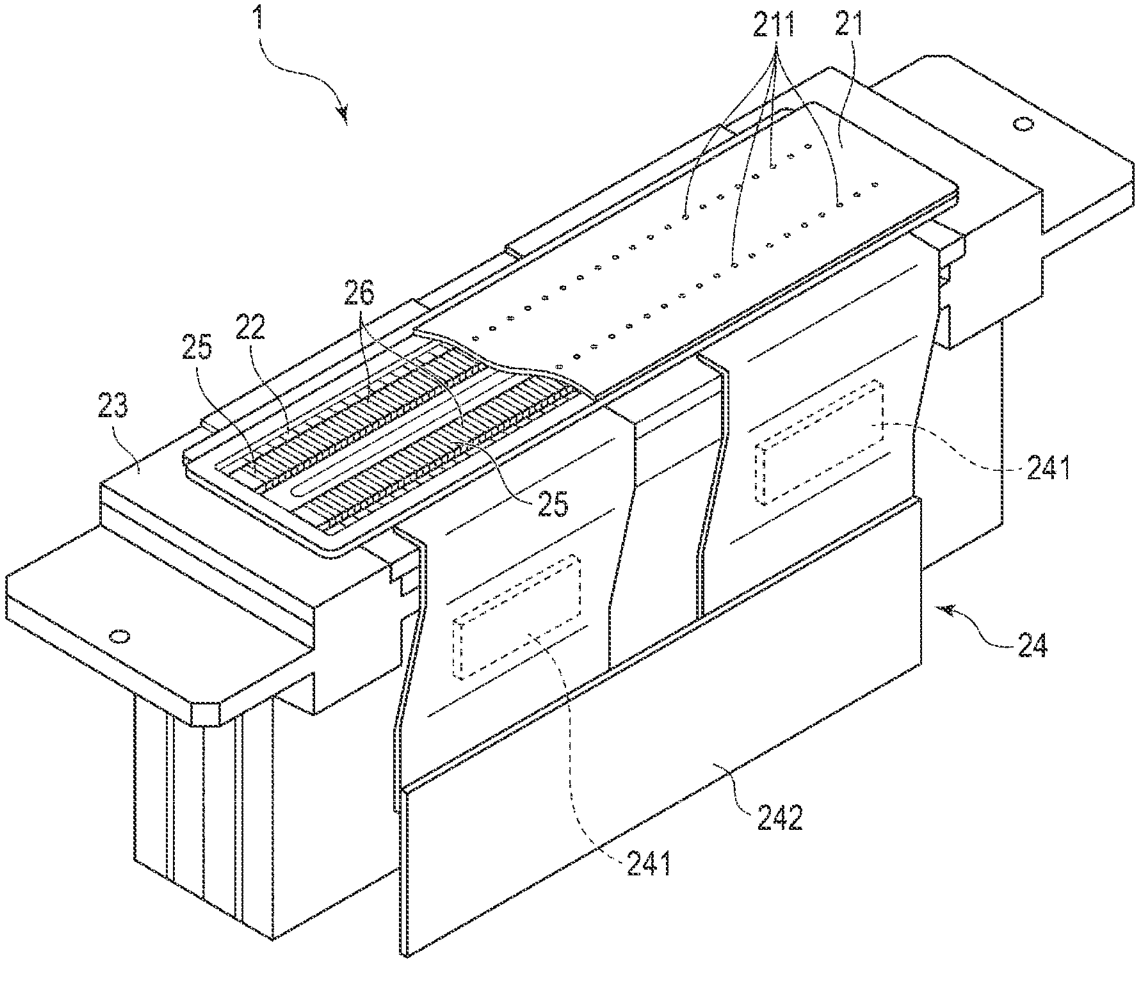
FIG. 2 is a perspective view illustrating a configuration of a liquid ejecting head.
Figure 3:
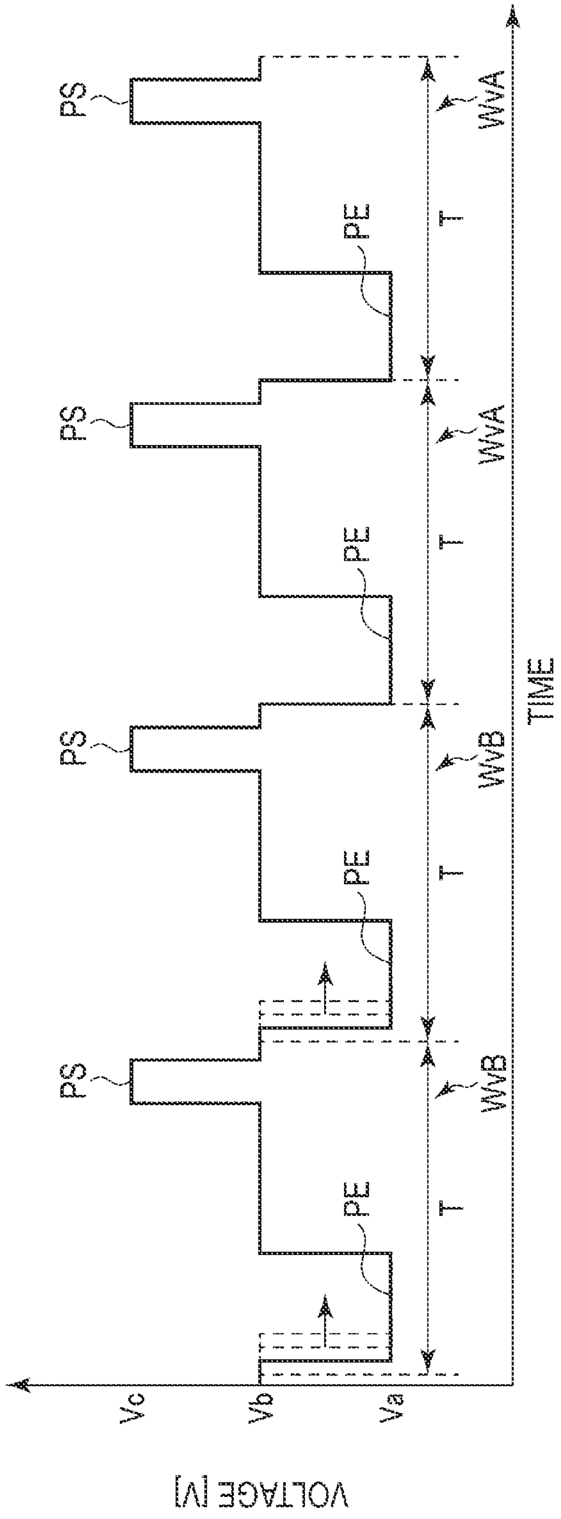
FIG. 3 is a graph illustrating a multidrop waveform.
Figure 4:
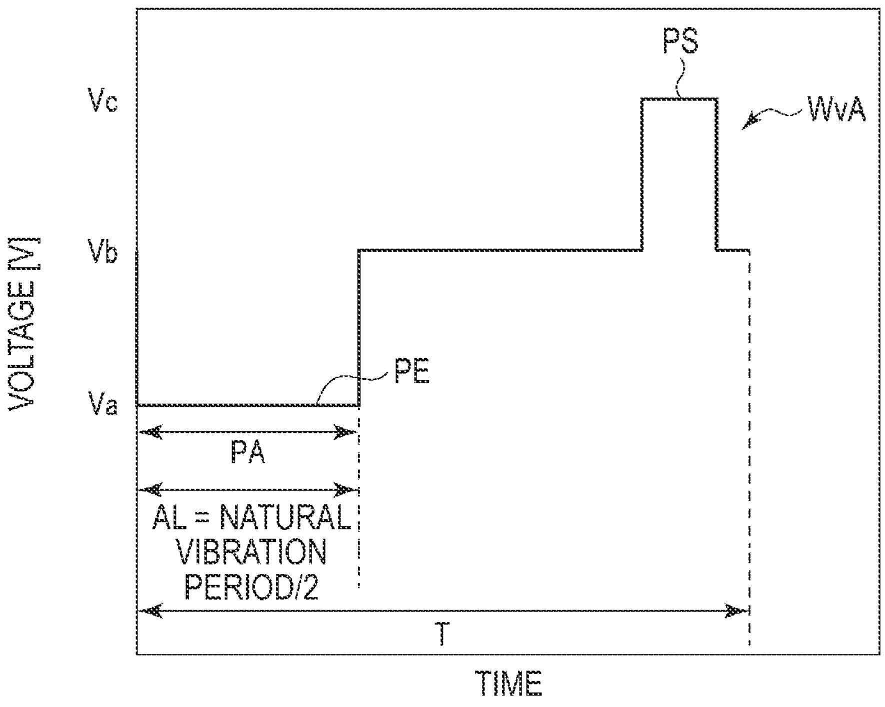
FIG. 4 is a waveform diagram illustrating a reference drop waveform.
Figure 5:
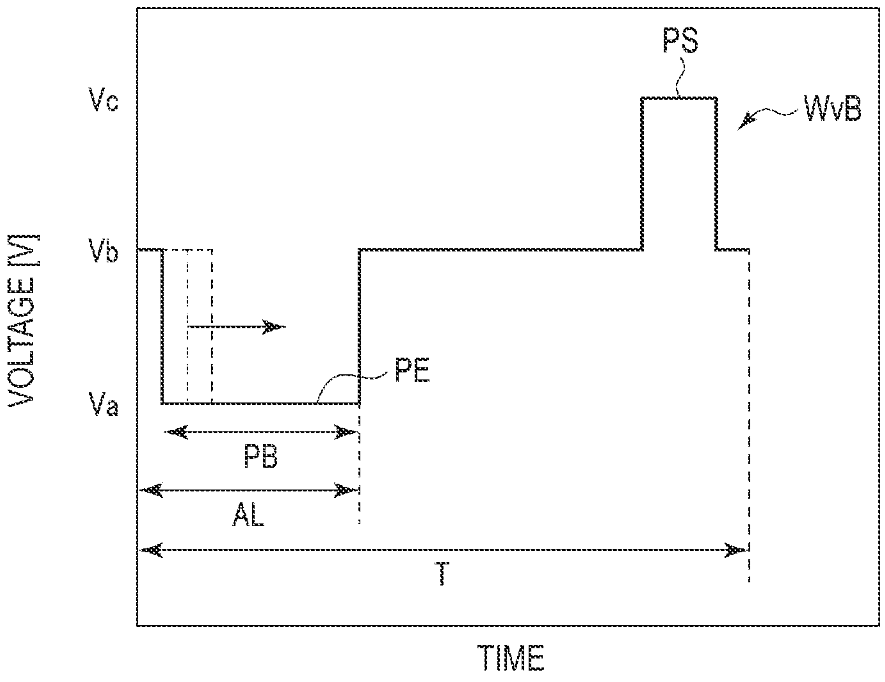
FIG. 5 is a waveform diagram illustrating a minute adjustment drop waveform.

A liquid ejecting head 1 and a liquid ejecting apparatus 2 using the liquid ejecting head 1 according to a first embodiment will be described with reference to the drawings. FIG. 1 is a diagram illustrating a configuration of the liquid ejecting apparatus 2 according to the first embodiment. FIG. 2 is a perspective view illustrating a configuration of the liquid ejecting head 1. FIG. 3 is a waveform diagram illustrating a multidrop waveform according to the first embodiment. FIG. 4 is a waveform diagram illustrating a reference drop waveform. FIG. 5 is a waveform diagram illustrating a minute adjustment drop waveform. FIG. 6 is a diagram illustrating correspondence of a print pattern and a combination of driving waveforms according to an embodiment. In each drawing, aspects may be expanded, reduced, or omitted to facilitate description.

The liquid ejecting apparatus 2 including the liquid ejecting head 1 will be described with reference to FIG. 1. The liquid ejecting apparatus 2 includes a casing 2111, a medium supply unit 2112, an image forming unit 2113, a medium discharge unit 2114, a conveyance device 2115 that is a support device, and a control unit 2118.

In this example, liquid ejecting apparatus 2 is an inkjet printer that performs an image forming process on a sheet P by ejecting a liquid such as ink while conveying the sheet P (recording medium) along a conveyance path 2001 formed from the medium supply unit 2112 to the medium discharge unit 2114 passing the image forming unit 2113.

The medium supply unit 2112 includes a plurality of feeding cassettes 21121. The image forming unit 2113 includes a support unit 2120 that supports a sheet and a plurality of head units 2130 disposed above the support units 2120. The medium discharge unit 2114 includes a discharge tray 21141.

The support unit 2120 includes a conveyance belt 21201 that is provided in a loop shape, a support plate 21202 that supports the conveyance belt 21201 from the rear, and a plurality of belt rollers 21203 provided on the rear side of the conveyance belt 21201.

The head units 2130 each include a liquid ejecting head 1 that are a plurality of inkjet heads, a supply tank 2132 serving as liquid storage tank mounted on the liquid ejecting head 1, and a pump 2134. Connection flow passages 2135 connecting the liquid ejecting heads 1 to the supply tanks 2132 are also provided.

The liquid ejecting head 1 is supplied with ink from the supply tank 2132. The liquid ejecting head 1 may be a non-circulation head in which ink is not circulated or a circulation head in which ink is circulated (recirculated).

In an embodiment, the liquid ejecting heads 1 for four colors of cyan, magenta, yellow, and black are provided, along with supply tanks 2132 for the four colors. The supply tanks 2132 are connected to the liquid ejecting heads 1 by the connection flow passages 2135.

As illustrated in FIG. 2, the liquid ejecting head 1 is an inkjet head and includes a nozzle plate 21 with a plurality of nozzles 211, an actuator substrate 22, a manifold 23 joined to the actuator substrate 22, and a driving circuit 24.

The actuator substrate 22 includes actuators 25 that serve as liquid ejecting units or elements. The actuators 25 have a plurality of pressure chambers 26 that are disposed to face the nozzles 211 and piezoelectric driving elements or the like adjacent to the pressure chambers 26. The actuator substrate 22 is configured with a predetermined flow passage including the plurality of pressure chambers 26 covered by the nozzle plate 21.

In the driving element adjacent to a pressure chamber 26, there is an electrode connected to the driving circuit 24. The electrode is connected to a control unit 2118 via a driver in the driving circuit 24. A wiring connects the driving circuit 24 to the electrode and the control unit 2118 so that driving control can be performed under the control of a processor.

The driving circuit 24 includes driver ICs 241 and wiring substrate 242. The driving circuit 24 drives a driving element of an actuator 25 by applying a drive voltage from the driver IC 241 to a wiring pattern for the actuator 25 so that a volume of the pressure chamber 26 adjacent to the driving element is increased or decreased so as to eject a liquid droplet from the nozzle 211 associated with the pressure chamber 26.

The liquid ejecting head 1 and the nozzle plate 21 form a flow passage including the pressure chambers 26 therein. The flow passage is also formed in part by the actuator substrate 22 and the manifold 23. The flow passage of the liquid ejecting head 1 is connected to the connection flow passage 2135 of the liquid ejecting apparatus 2.

The pump 2134 is a liquid feeding pump configured as a piezoelectric pump. The pump 2134 is connected to the control unit 2118 so that pumping can be controlled by the control unit 2118.

The connection flow passage 2135 includes a supply flow passage connected to an ink supply pipe of the liquid ejecting head 1. The connection flow passage 2135 includes a recovery flow passage connected to an ink discharge pipe of the liquid ejecting head 1. For example, if the liquid ejecting head 1 is of a non-circulation type, the recovery flow passage is connected to a maintenance device. If the liquid ejecting head 1 is of a circulation type, the recovery flow passage is connected to the supply tank 2132.

The conveyance device 2115 conveys the sheet P along the conveyance path 2001 from the feeding cassette 21121 of the medium supply unit 2112 to the discharge tray 21141 of the medium discharge unit 2114 passing through or by the image forming unit 2113. The conveyance device 2115 includes a plurality of pairs of guide plates 21211 to 21218 and a plurality of conveyance rollers 21221 to 21228 disposed along the conveyance path 2001. The conveyance device 2115 supports the sheet P so that the sheet P can be moved relative to the liquid ejecting head 1.

The control unit 2118 is, for example, a control substrate (circuit board or the like). In the control unit 2118, the processor, read only memory (ROM), a random access memory (RAM), an I/O port (input/output port), and an image memory are mounted.

The processor is a processing circuit such as a central processing unit (CPU) which may function as a controller. The processor controls, via the I/O port, the head unit 2130, a sheet driving motor, an input operation unit, and various sensors provided in the liquid ejecting apparatus 2. The processor transmits print data from the image memory to the driving circuit 24 in a drawing order.

The control unit 2118 also sets or selects an adjustment waveform based on adjustment data. For example, an adjustment waveform to be applied is selected from adjustment waveforms which may be set in a plurality of stages or increments.

The ROM stores various programs or the like. The RAM temporarily stores various types of variable data or image data or the like. The I/O port is an interface unit for receiving data from the outside and outputting data to the outside. The print data from an externally connected device is transmitted to the control unit 2118 via the I/O port to be stored in the image memory.

The print data is converted from image data to appropriate form for ejecting a liquid (e.g., ink) to provide an intended printing pattern or the like. For example, the print data corresponds to information regarding a color of each region or image density to be printed. The liquid ejecting head 1 selects a driving waveform in accordance with the print data and applies the driving waveform to the actuator 25.

Hereinafter, certain characteristics of a liquid ejecting head 1 used in a liquid ejecting apparatus 2 according to an embodiment and a driving waveform in accordance with a driving signal generated by the driving circuit 24 of the liquid ejecting head 1 will be described. In this example, the liquid ejecting head 1 is of a multidrop driving type and can be driven to provide a plurality of grayscale values by combining a plurality of drop waveforms including a reference drop waveform and an adjustment waveform. That is, the driving circuit 24 is driven with driving waveforms for multiple grayscale values in accordance with multidrop signals for a plurality of patterns (a plurality of types).

The control unit 2118 sets a driving waveform to be applied to each driving element based on the print data. For example, the control unit 2118 sets a combination of a minute adjustment drop waveform and a reference drop waveform based on the print data. Specifically, the control unit 2118 selects a driving pattern for each element from a plurality of preset and stored patterns.

The control unit 2118 drives a liquid ejecting unit in accordance with a plurality of multi-waveform patterns in which a plurality of different drop waveforms are combined and of which at least one pattern includes a reference drop waveform for ejecting a liquid and a minute adjustment drop waveform capable of adjusting an ejection volume.

For example, the control unit 2118 drives each of the plurality of driving elements respectively corresponding to nozzles of the liquid ejecting unit in accordance with the plurality of multi-waveform patterns including the reference drop waveform, the minute adjustment drop waveform, and a non-ejection waveform based on the print data.

The control unit 2118 sets a increment of the minute adjustment drop waveform for each nozzle separately. That is, if sixteen variable increments (stages) are possible, a specific stage appropriate for the minute adjustment data for a nozzle is selected from among the possible sixteen stages.

FIG. 6 is a table illustrating print patterns for a plurality of grayscales and driving waveforms corresponding to the print patterns according to an embodiment. In this example embodiment, the driving waveform includes a maximum of four drop waveforms (elements) in a single print period and driving is performed at 5 possible grayscale levels corresponding to Print Pattern 0 to Print Pattern 4. In the embodiment, one print period has up to four drops and the periodic length (T) for each drop waveform is equal. In this case, one print period equals 4T. For example, an ejection volume of the reference drop waveform is 1 drop=6 pL. In the present embodiment, minute adjustment control for which the reference ejection volume is 4 drops=24 pL will be described.

A driving waveform for each pattern can be a multidrop waveform including a plurality drop waveforms and is configured with a combination of drop waveforms WvA and WvB and a non-ejection waveform (see FIGS. 3 and 4.

In Example 1, for the driving waveform of Pattern 0, first to fourth drops positions use a non-ejection waveform.

The driving waveform of Pattern 1 is a multi-waveform pattern in which the first drop is formed with the minute adjustment drop waveform WvB and second to fourth drops are formed with the reference drop waveform WvA.

The driving waveform of Pattern 2 is a multi-waveform pattern in which first and second drops are formed with the minute adjustment drop waveform WvB and third and fourth drops are formed with the reference drop waveform WvA.

The driving waveform of Pattern 3 is a multi-waveform pattern in which first to third drops are formed with the minute adjustment drop waveform WvB and a fourth drop is formed with the reference drop waveform WvA.

Pattern 4 is a multi-waveform pattern in which all drops are formed with the minute adjustment drop waveform WvB. In this embodiment, if the minute adjustment drop waveform WvB is to be included in the multi-waveform pattern, it is set among four drops before the reference drop waveform is used. That is, if one minute adjustment drop waveform WvB is included, the minute adjustment drop waveform WvB is set in the first drop among the four drops. If two minute adjustment drop waveforms WvB are included, the minute adjustment drop waveforms WvB are set in the first and second drops among the four drops. If three minute adjustment drop waveforms WvB are included, the minute adjustment drop waveforms WvB are set in the first to third drops among the four drops.

FIG. 3 illustrates the drop waveform WvA and FIG. 4 illustrates the minute adjustment drop waveform WvB. In FIGS. 3 to 5, the vertical axis represents a voltage (V) and the horizontal axis represents a time (μs).

Here, each of the drop waveforms WvA and WvB has an expansion element and a contraction element. If a pulse width of the expansion element differs, an ejection volume differs in accordance with the drop waveforms WvA and WvB. The period T in drop waveforms WvA and WvB is constant.

A driving waveform at each grayscale level can be a multidrop waveform including a plurality of drop waveforms and is configured with a combination of a plurality of drop waveforms.

Each of the drop waveforms WvA and WvB has an expansion element and a contraction element. If a pulse width of the expansion element differs, an ejection volume differs in accordance with the drop waveforms. That is, the driving circuit 24 drives an actuator at a plurality of grayscales with different total ejection volumes of the liquid within one print period by a combination of plurality of drop waveforms with different ejection volumes.

As illustrated in FIGS. 3 to 5, both the reference drop waveform WvA and the minute adjustment drop waveform WvB include: an expansion element PE in which a voltage is lowered from an intermediate voltage Vb to an expansion voltage Va to expand the pressure chamber 26 and the voltage returns to the intermediate voltage Vb after a given time passes to eject ink; and a contraction element PS in which the voltage is raised from the intermediate voltage Vb to a contraction voltage Vc higher than the intermediate voltage Vb to contract the pressure chamber 26 and the voltage returns to the intermediate voltage Vb again. For example, the intermediate voltage Vb=0 V. The intermediate voltage Vb is held (maintained) for a given time between the expansion element PE and the contraction element PS. The contraction voltage Vc is higher than the expansion voltage Va.

A pulse width PB of the expansion element of the minute adjustment drop waveform WvB is shorter than a pulse width PA of the expansion element PE of the reference drop waveform WvA. An ejection volume can be increased or decreased and finely adjusted by adjusting the pulse width PB of the expansion element of the minute adjustment drop waveform WvB.

The drop waveforms WvA and WvB have different pulse widths PA and PB of the expansion element PE, and thus liquids are ejected with different ejection volumes. In Example 1, a pulse width of the expansion element PE of the minute adjustment drop waveform WvB is narrower than that of the reference drop waveform WvA and thus causes a small ejection volume. That is, a pulse width of the expansion element PE of the reference drop waveform WvA is broader than that of the minute adjustment drop waveform WvB and thus has a larger ejection volume.

A pulse width of the expansion element of the reference drop waveform is assumed to be the acoustic length (AL). In this context, the acoustic length (AL) is half of a natural vibration period of the pressure chamber 26 of the liquid ejecting head 1. The pulse width of the expansion element is a value determined by the acoustic length (AL). For example, the reference drop waveform WvA provides an ejection volume of 6 pL.

In the minute adjustment drop waveform WvB, minute adjustment data (four bits) is allocated for each nozzle and an ejection amount corresponding to each of sixteen stages can be set with the minute adjustment data. For example, the control unit 2118 adjusts an ejection volume by adjusting a pulse width of an adjustment waveform in a plurality of stages. For example, the pulse width of the expansion element in the minute adjustment drop waveform is set to a value less than the AL in sixteen increments (stages). That is, the pulse width PB of the expansion element of the minute adjustment drop waveform WvB corresponds to the pulse width PA of the expansion element of the reference drop waveform WvA being reduced step by step in the sixteen stages. The minute adjustment data is various types of data for minute adjustment. The minute adjustment data is data for changing the waveform width of an ejection waveform or data for changing a drive voltage.

That is, the control unit 2118 selects and sets the pulse width of the minute adjustment drop waveform WvB to one sixteen stages in accordance with the minute adjustment data for each nozzle and can minutely adjust an ejection volume of a liquid droplet to be ejected from the nozzle by selecting a pattern of a combination of the minute adjustment drop waveforms WvB and the reference drop waveform WvA in accordance with print data.

FIG. 7 is a graph illustrating an ejection volume and a minute adjustment level in a print pattern according to an embodiment and a comparative example. In FIG. 7, minute adjustment levels and ejection volumes in the cases of print patterns 1, 2, and 3 are illustrated. A minute adjustment level and an ejection volume of a print pattern 4 (illustrated in FIG. 10) in which four consecutive minute adjustment waveforms are used is illustrated as a comparative example.

Figure 8:
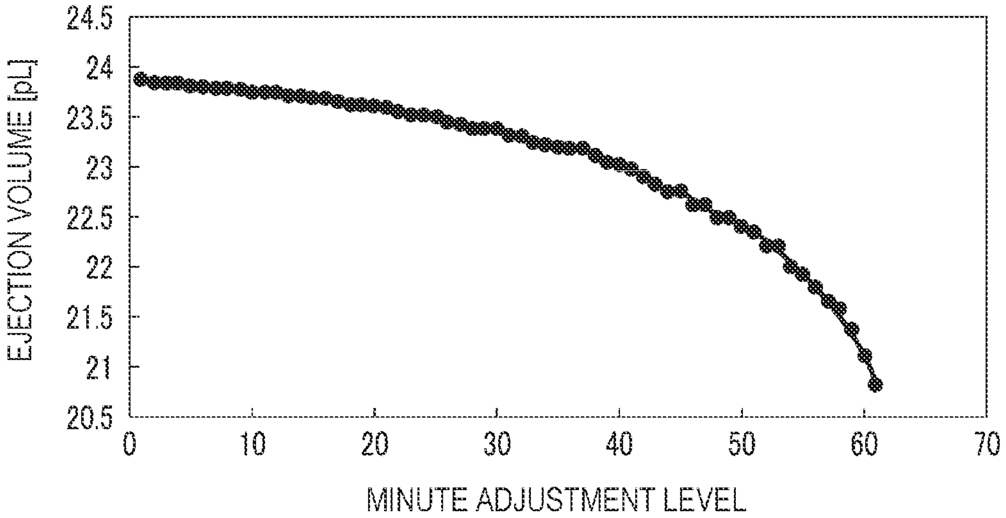
FIG. 8 is a diagram illustrating an ejection volume and a minute adjustment level in a print pattern according to an embodiment.
Figure 9:
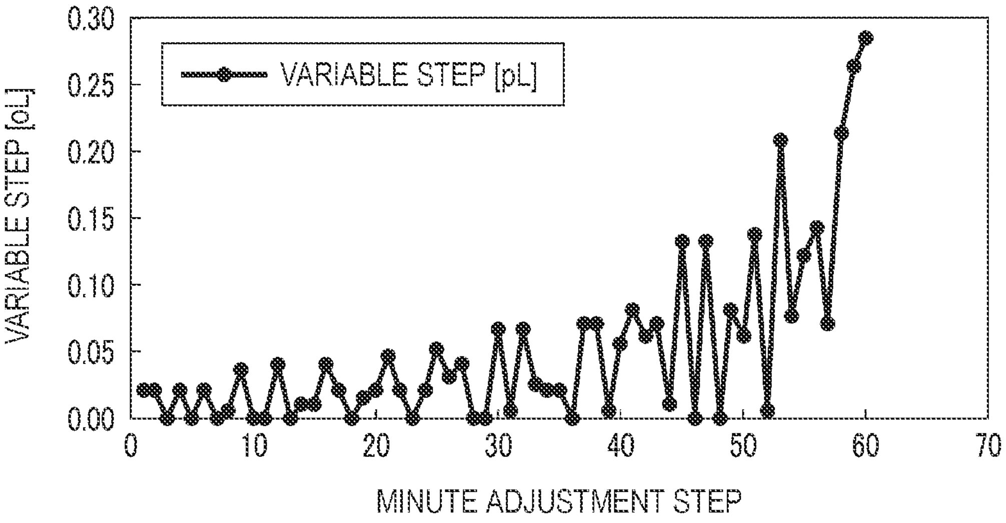
FIG. 9 is a diagram illustrating a minute adjustment step and a variable step in a print pattern.

FIG. 8 is a diagram illustrating an ejection volume and a minute adjustment level in a print pattern according to the embodiment. FIG. 9 is a diagram illustrating a minute adjustment step and a variable step in the print pattern according to the embodiment. FIG. 9 is a graph illustrating a difference in an ejection volume between adjacent points of FIG. 8. FIG. 10 is a diagram illustrating correspondence of a print pattern and a combination of driving waveforms according to the comparative example. FIG. 10 illustrates a combination pattern in which the drops are combinations of a minute adjustment drop waveform and a non-ejection. FIG. 11 is a diagram illustrating a minute adjustment step and a variable step in the print pattern 4 (see FIG. 10) according to the comparative example. FIG. 11 is a graph illustrating a difference in an ejection volume between adjacent points of FIG. 10.

In FIG. 7, in the case of the comparative example, a distribution of sixteen stages of Pattern 4 in which the minute adjustment drop waveform is set for all the drops is formed at about 24 pL. In the print patterns 1 to 3 in which the non-ejection waveform is set, the ejection volume is 18 pL or less. In the case of the embodiment, in addition to the distribution of Pattern 4 in which the minute adjustment drop waveform is set, the other print patterns 1, 2, and 3 in which the reference drop waveform is combined are also distributed near 24 pL, and thus it can be understood that finer adjustment can be performed. Pattern 4 according to the comparative example and Pattern 4 according to the embodiment (FIG. 7) are patterns in which the minute adjustment drop waveform WvB is set for all the four drops and are the same patterns.

If a variable step of FIG. 9 is compared with a variable step of FIG. 11, it can be understood that the variable step in the embodiment is reduced more than in the comparative example.

Further, according to the distribution according to the comparative example of FIG. 7 and the distribution of FIG. 9, for example, for adjustment in a range of 24 pL to 23 pL, it can be understood that adjustment can be performed at 8 stages in the comparative example of FIG. 7 and adjustment can be performed at 43 stages in the embodiment of FIG. 9.

According to the embodiment, an ejection volume can be controlled arbitrarily by combining two drop waveforms WvA and WvB and controlling the ejection volume in a driving waveform for each grayscale level. That is, while 8 stages are set between 23.0 to 24.0 pL according to Comparative Example 1, the ejection volume can be controlled in 43 stages between 23.0 to 24.0 pL in Example 1. In this way, it is possible to adjust the ejection volume finely around a specific ejection volume.

That is, according to the embodiment, the ejection volume can be controlled at a small cut for each nozzle by controlling grayscales in a pattern combination including the reference drop waveform and the minute adjustment drop waveform in addition to the adjustment of the ejection volume in the minute adjustment drop waveform for each nozzle. That is, by combining the reference drop waveform and the minute adjustment drop waveform, it is possible to further widen a range of possible grayscale expression. For example, density of ink of an image can be minutely adjusted finely and uniform coating can be obtained.

The minute adjustment drop waveform is a waveform in which an ejection volume is smaller than in the reference drop waveform and the ejection speed tends to be slower. Accordingly, by driving the first half of the drops in the minute adjustment drop waveform and driving the second half of the drops in the reference drop waveform, the second half of the drops easily follow the first half of the drops, and thus dots are united before landing. The reference drop waveform is set as a waveform which extends to a half (AL) of a natural vibration period in time to perform an ejection operation, and thus ejection efficiency is good. However, the extension time of minute adjustment drop waveform is shorter than AL. As a result, the ejection volume can be reduced more than that of the reference drop waveform.

Embodiments are not limited to the above-described configurations.

In an embodiment, the control unit 2118 performs the control operation, but embodiments are not limited thereto and other controller type elements may be utilized. For example, the liquid ejecting head 1 includes a driving circuit that drives an actuator. The liquid ejecting head 1 itself may serve as a driving device or a driving device may be mounted to or integrated with the liquid ejecting head 1.

In an embodiment, four-drop driving has been described, but the disclosure is not limited thereto. The number of drops may be three or less, or five or more. Further, the drop waveforms are not limited to two types. Three types of drop waveforms or four or more types of drop waveforms may be combined.

Any multi-waveform pattern may be adopted as a non-ejection waveform for which a liquid is not ejected or at least a part of any drop waveform may be a non-ejection waveform. The number of drops involving ejection of a liquid may differ between the patterns.

For example, in the multi-waveform patterns, the number of ejection waveforms can also be changed. That is, by including one or more non-ejection waveform in any of the multi-waveform patterns and changing the number of non-ejection waveforms, it is also possible to adjust the ejection volume. Even in this case, by combining the reference drop waveform and the minute adjustment drop waveform as any multi-waveform pattern, it is possible to perform control in fine grayscales. The specific parameters of the reference drop waveform or the minute adjustment drop waveform are not limited to the foregoing embodiments. For example, the minute adjustment drop waveform may be a waveform in which the ejection volume can be adjusted and additional conditions or settings can be applied.

In certain examples, the ejection volume is set to be different in accordance with the pulse width of the expansion element, but the embodiments are not limited thereto. For example, the ejection volume can also be set to be different in accordance with a pulse width of another element or a voltage value.

The configuration of the liquid ejecting head 1 is not limited to the foregoing examples and another type of head may be used. For example, the liquid ejecting head may have a configuration in which the liquid ejecting unit is driven by vibrating a vibration plate provided between a pressure chamber and a driving element unit through deformation of the driving element unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A driving device for liquid ejection heads, the driving device comprising:

a control unit configured to apply a multi-droplet waveform to a liquid ejecting element, the multi-droplet waveform being one of a plurality of preset patterns in which each droplet waveform in the multi-droplet waveform is one of a reference ejection waveform or a minute adjustment waveform, wherein the reference ejection waveform causes a droplet of a nominal reference volume to be ejected by the liquid ejecting element, the minute adjustment waveform causes a droplet of less than the nominal reference volume to be ejected by the liquid ejecting element in variable volume increments, wherein the control unit is configured to apply multi-droplet waveforms to each of a plurality of liquid ejecting elements, wherein the control unit is configured to select a multi-droplet waveform for each of the plurality of liquid ejecting elements, respectively, based on print data, and wherein the control unit is further configured to adjust the pulse width of the expansion pulse of at least one minute adjustment waveform in the multi-droplet waveform selected for at least one liquid ejecting element in the plurality of liquid ejecting elements based on adjustment data.

2. The driving device according to claim 1, wherein the reference ejection waveform includes an expansion pulse for expanding a pressure chamber of the liquid ejecting element with an expansion voltage, and a pulse width of the expansion pulse of the minute adjustment waveform is less than a pulse width of the expansion pulse of the reference drop waveform.

3. The driving device according to claim 1, wherein any minute adjustment waveforms in the multi-droplet waveforms come before any reference droplet waveform.

4. The driving device according to claim 1, wherein the plurality of preset patterns includes a non-ejection waveform that does not cause a droplet to be ejected by the liquid ejecting element, and the control unit is further configured to apply the non-ejection waveform to the liquid ejection element.

5. The driving device according to claim 1, further comprising:

a driving circuit connecting the control unit and the liquid ejecting element.

6. A liquid ejection system, comprising:

a controller;

a drive circuit connected to the controller; and a liquid ejection head including a plurality of nozzles associated with a plurality of liquid ejecting elements connected to the drive circuit, wherein the controller is configured to apply a multi-droplet waveform to each liquid ejecting element via the drive circuit, each multi-droplet waveform being one of a plurality of preset patterns in which each droplet waveform in the multi-droplet waveform is one of a reference ejection waveform or a minute adjustment waveform, the reference ejection waveform causes a droplet of a nominal reference volume to be ejected by the liquid ejecting element, the minute adjustment waveform causes a droplet of less than the nominal reference volume to be ejected by the liquid ejecting element in variable volume increments, wherein the controller is configured to select a multi-droplet waveform for each of the plurality of liquid ejecting elements, respectively, based on print data, and wherein the controller is further configured to adjust the pulse width of the expansion pulse of at least one minute adjustment waveform in the multi-droplet waveform selected for at least one liquid ejecting element in the plurality of liquid ejecting elements based on adjustment data stored in the controller.

7. The liquid ejection system according to claim 6, wherein the reference ejection waveform includes an expansion pulse for expanding a pressure chamber of the liquid ejecting element with an expansion voltage, and a pulse width of the expansion pulse of the minute adjustment waveform is less than a pulse width of the expansion pulse of the reference drop waveform.

8. A liquid ejecting apparatus, comprising:

a driving device; and a liquid ejecting head connected to the driving device configured to eject a liquid, wherein the driving device includes:

a control unit configured to apply a multi-droplet waveform to a liquid ejecting element, the multi-droplet waveform being one of a plurality of preset patterns in which each droplet waveform in the multi-droplet waveform is one of a reference ejection waveform or a minute adjustment waveform, the reference ejection waveform causes a droplet of a nominal reference volume to be ejected by the liquid ejecting element, the minute adjustment waveform causes a droplet of less than the nominal reference volume to be ejected by the liquid ejecting element in variable volume increments, wherein the control unit is configured to apply multi-droplet waveforms to each of a plurality of liquid ejecting elements, wherein the control unit is configured to select a multi-droplet waveform for each of the plurality of liquid ejecting elements, respectively, based on print data, and wherein the control unit is further configured to adjust the pulse width of the expansion pulse of at least one minute adjustment waveform in the multi-droplet waveform selected for at least one liquid ejecting element in the plurality of liquid ejecting elements based on adjustment data.

9. The liquid ejecting apparatus according to claim 8, wherein the reference ejection waveform includes an expansion pulse for expanding a pressure chamber of the liquid ejecting element with an expansion voltage, and a pulse width of the expansion pulse of the minute adjustment waveform is less than a pulse width of the expansion pulse of the reference drop waveform.

10. The liquid ejecting apparatus according to claim 8, wherein any minute adjustment waveforms in the multi-droplet waveforms come before any reference droplet waveform.

* * * * *